Figure 1:
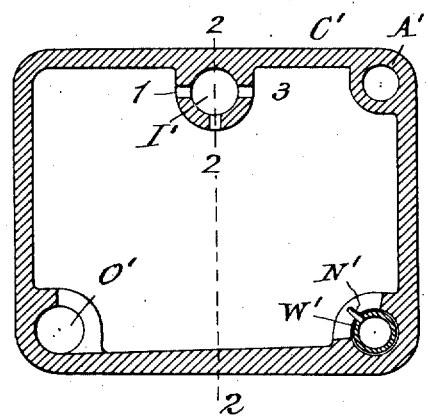

C. W. MERRILL.
PROCESS FOR TREATING SEMISOLID MATERIAL IN THE CONTAINERS OF FILTER PRESSES AND REMOVING THE SAME THEREFROM.
APPLICATION FILED JUNE 7, 1910.

1,226,104.

Patented May 15, 1917.
2 SHEETS—SHEET 1.

Witnesses:
Edward Howland
Charles Engel

Inventor
Charles W. Merrill
By his Attorney

C. W. MERRILL.
PROCESS FOR TREATING SEMISOLID MATERIAL IN THE CONTAINERS OF FILTER PRESSES AND REMOVING THE SAME THEREFROM.
APPLICATION FILED JUNE 7, 1910.

1,226,104.

Patented May 15, 1917.

UNITED STATES PATENT OFFICE.

CHARLES W. MERRILL, OF BERKELEY, CALIFORNIA.

PROCESS FOR TREATING SEMISOLID MATERIAL IN THE CONTAINERS OF FILTER-PRESSES AND REMOVING THE SAME THEREFROM.

1,226,104.     Specification of Letters Patent.     Patented May 15, 1917.

Application filed June 7, 1910. Serial No. 565,547.

*To all whom it may concern:*

Be it known that I, CHARLES W. MERRILL, citizen of the United States, and resident of Berkeley, Alameda county, California, have invented a new and useful Improvement in Processes for Treating Semisolid Material in the Containers of Filter-Presses and Removing the Same Therefrom, of which the following is a specification.

My invention relates to an improvement in processes for treating a semi-solid material in the containers of filter presses and for removing the same therefrom, and the primary object of my improvement is to facilitate and cheapen the removal from the containers of the material which will not pass through the filtering medium. In Letters Patent of the United States No. 798,200, granted to me on the 29th day of August 1905, I described and claimed processes of removing solid or semi-solid materials from containers of pressure filters which consisted in providing an inlet for each distance frame or container of the filter press through which liquid, vapor or gas could be introduced under pressure and the solid, semi-solid or unfilterable contents sluiced or forced out through an exit in said frame, which exit might either be an independent outlet or might be the opening through which the material to be filtered was originally introduced.

The present invention is an improvement on the aforesaid process, and combines as a part thereof the treatment of the semi-solid material in the containers with any desired liquid, gas or vapor for any desired purpose, and the removal of the solid or semi-solid material in addition to the agency employed in said patented process by causing the same to be charged upon the cloths of the filter plates within the containers in thin layers, and afterward as an element in the process subjecting them to the treatment outlined above and subsequently subjecting the layers of solid or semi-solid material to the pressure of liquid, vapor or gas acting from behind the filter cloths. For the purpose of best explaining how the present process is conducted, I would refer to accompanying sheet of drawings of a diagrammatic nature which show types of the apparatus by which my present process may be carried out.

Figure 2:
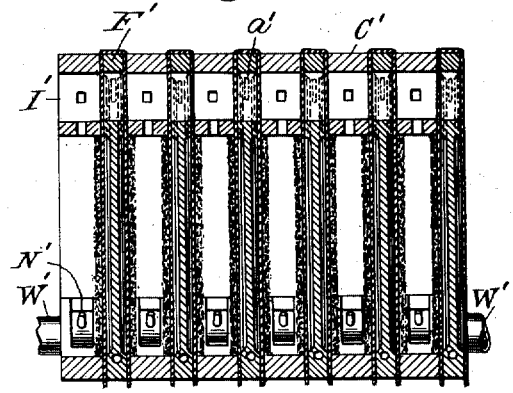
Figure 3:
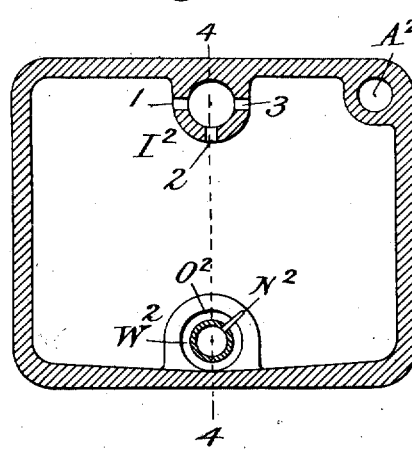
Figure 4:
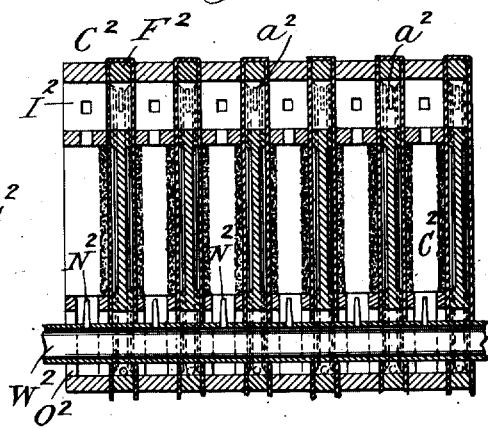
Figure 5:
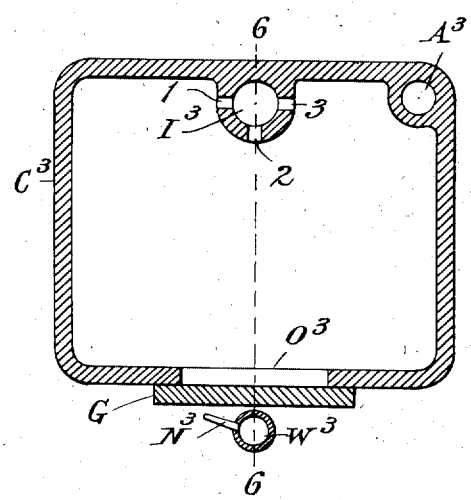
Figure 6:
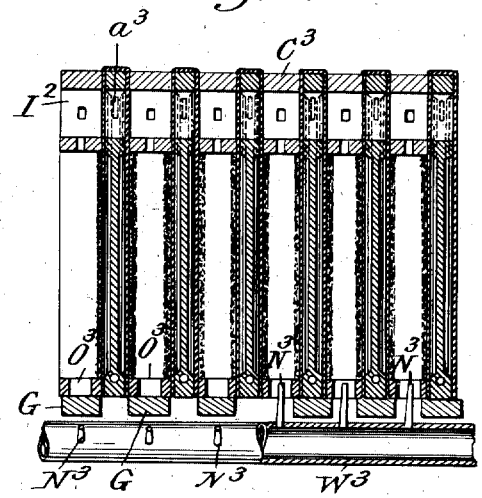
Figure 7:
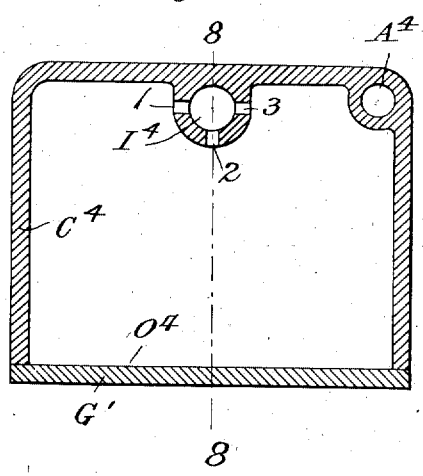
Figure 8:
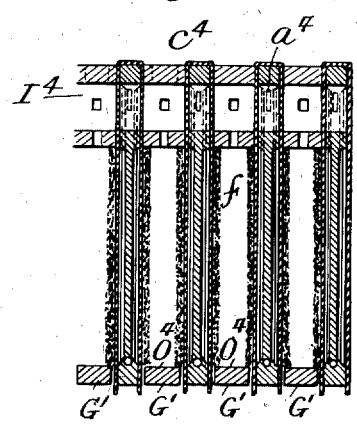

In the drawings, Figure 1 is a longitudinal cross section of a container; Fig. 2 is a vertical longitudinal section on the line 2 2 of Fig. 1 of a series of containers and filter plates put together in the manner usual in filter presses; Fig. 3 is a vertical longitudinal section of a modified form of container; Fig. 4 is a vertical longitudinal section of a series of such modified form of containers put together on the line 4 4 of Fig. 3; Fig. 5 is a vertical cross section of a container of a still further modified form; Fig. 6 is a vertical longitudinal section on the line 6—6 of Fig. 5 of a series of such modified form of containers put together; Fig. 7 is a longitudinal cross section of a container with the supply pipe or channel $W^1$, $W^2$, $W^3$, omitted and the gate at the bottom of the container elongated so as to increase the clearance space from the interior of the container; Fig. 8 is a vertical longitudinal section on the line 8—8 of Fig. 7 of a series of such modified form of containers shown in Fig. 7 put together.

In the construction shown in Figs. 1 and 2 $C^1$ is the frame of the container, which may be in cross-section of any convenient shape. $O^1$ is an opening or outlet at one side through which the solid, semi-solid, or unfilterable material, hereinafter for convenience called the slimes, is removed from the containers and which when a series of containers are put together in a filter press makes a continuous opening through the press, which is closed at the ends in any convenient manner and discharges into any suitable receptacle. $I^1$ is an inlet through which the material to be filtered may be introduced, which inlet is of the same general character and becomes continuous when the containers are put together in the filter press and is provided with the openings 1, 2 and 3, from which the material may be introduced into the chamber. $W^1$ is a supply pipe or channel through which the liquid, vapor, or gas is introduced under pressure for the purpose of removing the precipitate. This is provided with a nozzle, slit, or hole $N^1$ which enters into each container. $F^1$ is the filter plate, which is introduced between the containers.

In the second construction shown in Figs. 3 and 4, the opening $O^2$, which corresponds to $O^1$ in the structure shown in Figs. 1 and 2, is placed within the container and contains in its interior the supply pipe $W^2$, fixed or rotative, which corresponds to the pipe $W^1$ and like it is provided with nozzles $N^2$ $N^2$, similar to the nozzles $N^1$ $N^1$, which pass into each container, a series of these being employed, as in the previous construction. $I^2$ represents the inlet through which the material to be filtered is introduced, which corresponds to the inlet $I^1$ in Figs. 1 and 2.

In the third construction shown in Figs. 5 and 6, the discharge is effected through a series of openings $O^3$, which are closed by gates G, and the supply pipe $W^3$, which is fixed or rotative, is provided with a similar series of nozzles $N^3$ so that when the gates G are opened cleansing material may be introduced through the pipe $W^3$.

In the fourth construction shown in Figs. 7 and 8, the discharge is effected by the open bottom $O^4$ which is closed by the gate $G^1$. The rotative pipe W, $W^1$, $W^2$ is eliminated, and when the gate is opened the contents of the container fall out into a suitable collecting receptacle, as soon as the pressure is exerted behind the cloths.

In each of the constructions outlets $A^1$, $A^2$, $A^3$ and $A^4$ respectively are provided for the effluent liquids, vapors or gases.

The material to be filtered or treated is supplied to the containers through the inlet I or O or both and thereupon the solid, semi-solid or unfilterable material, hereinafter for convenience called the slime, will settle upon the filter cloths as shown by the lines in the container on the extreme right of Fig. 2, so that it will form a layer on the cloths of the filter plates and cover the same and a space will be left in the container between the two layers. If now it is desired to subject the slime to any metallurgical treatment, the vapor, gas or liquid employed for such purpose may be introduced either through channels $I^1$ $I^2$ $I^3$ and $I^4$ and $O^1$ $O^2$ $O^3$ and $O^4$ or through the nozzle $N^1$ $N^2$ $N^3$ and $N^4$. After this has been done, in cases where it is deemed advisable to do so a vapor, liquid or gas under pressure is introduced through the ports $a^1$ $a^2$ $a^3$ $a^4$ from the channels $A^1$ $A^2$ $A^3$ $A^4$ and behind the filter plates, the action of which is to cause the layers of slime to fall off of the cloths and drop to the bottom of the containers, thereupon the gates $G^1$ are opened, if the container be of the type shown in Figs. 7 and 8, and the slimes will be discharged into a suitable receptacle; or, if the slimes are of such a character that they are not easily discharged from the container by their own weight, they can be washed out of the container by means of vapor, gas or liquid being introduced into it under pressure through the nozzle pipe or hole N $N^1$ $N^2$ $N^3$ as shown in Figs. 1, 2, 3, 4 and 5 and 6.

If desired, a plurality of inlets may be employed for the introduction either of the mixture, the washing out medium, or the medium employed for metallurgical treatment and the container may be either of the type of those above described or may be of any other types described by me in earlier Letters Patent of the United States Nos. 842,484, 856,596 and 905,341, heretofore issued to me.

I claim as my invention:

1. The hereinbefore described method of treating in and removing solid or semi-solid material from the containers of pressure filters consisting in depositing the same in thin layers upon the filter cloths which form the closure of the filters so that a space is left between the layers, then subjecting the layers to any desired metallurgical treatment, subjecting the material during the deposition and treatment to continuous pressure upon the layers and then opening the gates of the containers and finally subjecting the layers to the pressure of liquid, vapor or gas acting from behind the filter cloths whereby the same are discharged from the pressure filter through said bottom outlet gates of the containers.

2. The hereinbefore described method of treating in and removing solid or semi-solid material from, the containers of pressure filters consisting in depositing the same in thin layers upon the filter cloths which form the closure of the filters so that a space is left between the layers, then subjecting the layers to any desired metallurgical treatment, subjecting the material during the deposition and treatment to continuous pressure upon the layers, subjecting the layers to the pressure of liquid, vapor or gas acting from behind the filter cloths, then forcing said material out of the containers by the impingement of a stream of liquid, vapor or gas under pressure directly upon and below the upper surface of the contents of said containers without separating the units of the same.

3. The hereinbefore described method of removing solid or semi-solid material from the containers of pressure filters consisting in depositing the same in thin layers upon the filter cloths which form the closure of the filters so that a space is left between the layers, then subjecting the layers to any desired metallurgical treatment, subjecting the material during the deposition and treatment to continuous pressure upon the layers and then opening the gates of the containers and finally subjecting the layers to the pressure of liquid, vapor or gas acting from behind the filter cloths then sluicing or forcing said material out by the impingement of a stream of liquid, vapor or gas under pressure introduced upon the contents of said containers at a point adjacent to the outlet thereof.

4. The hereinbefore described method of treating solid or semi-solid material in the containers of pressure-filters consisting in depositing the same under continuous pressure in thin layers on the filter-cloths which form the closure of the containers so that a space is left between the layers, then subjecting the layers while under continuous pressure to any desired metallurgical treatment.

In testimony, that I claim the foregoing as my invention, I have signed my name in presence of two witnesses, this third day of June 1910.

CHARLES W. MERRILL.

Witnesses:
WILLARD PARKER BUTLER,
CHARLES ENGEL.